UNITED STATES PATENT OFFICE.

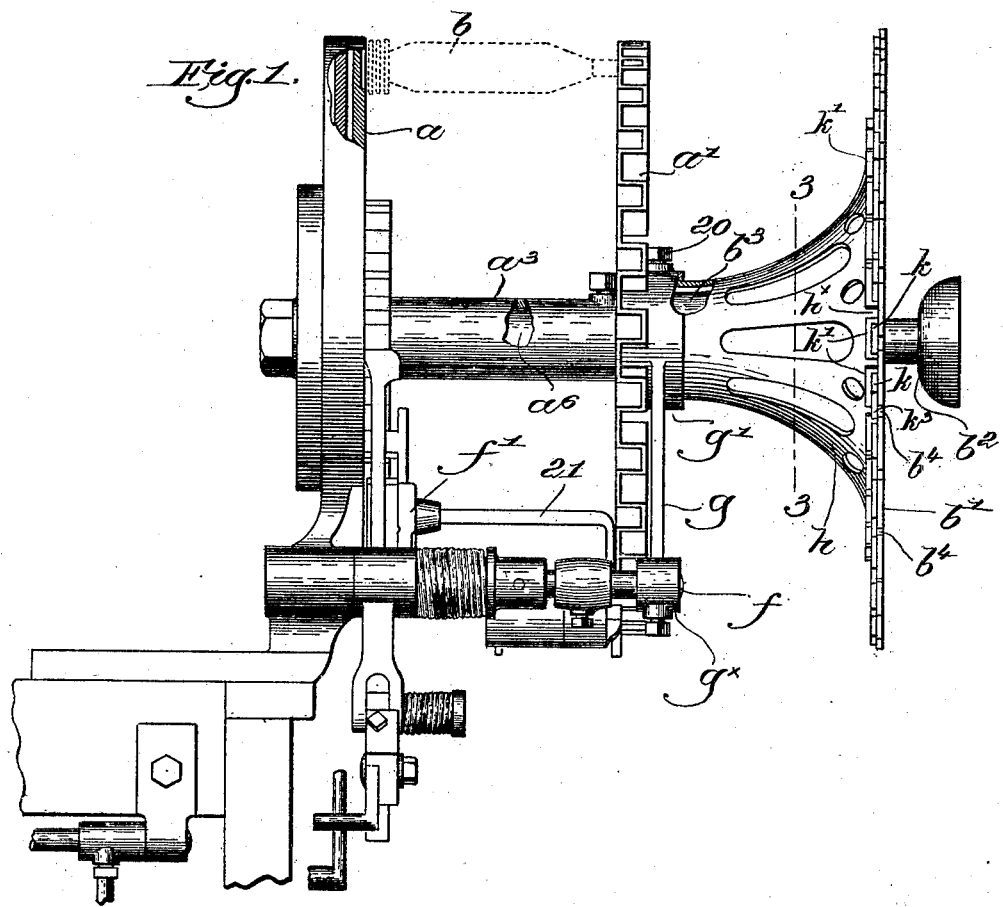

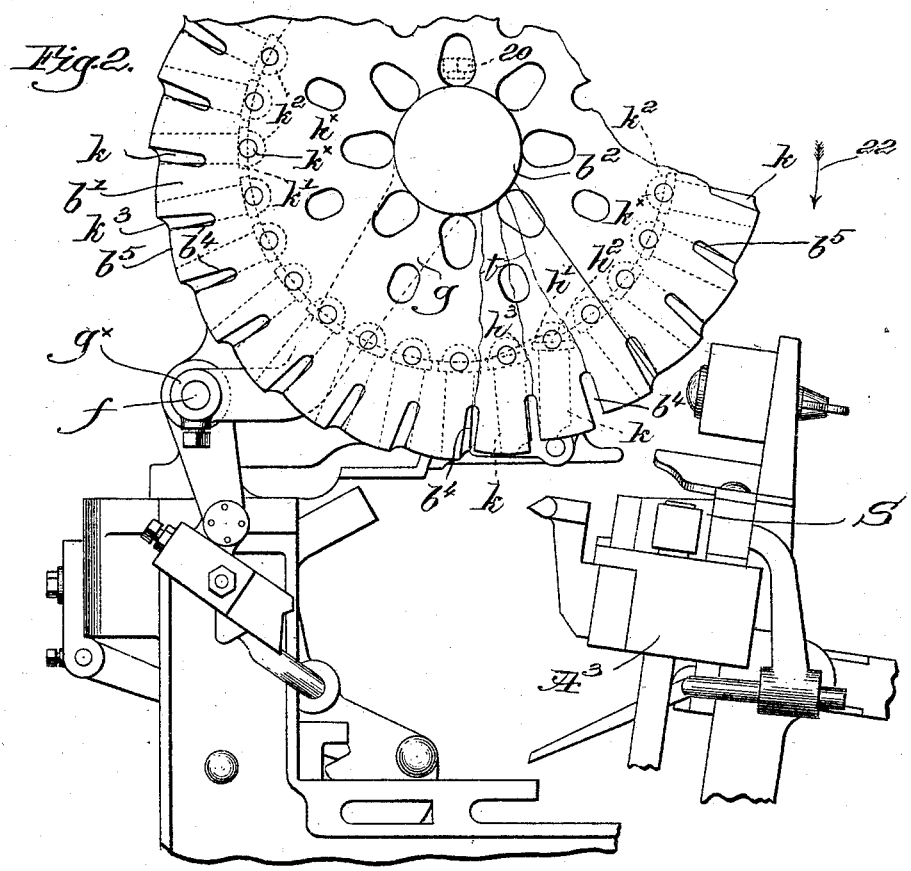
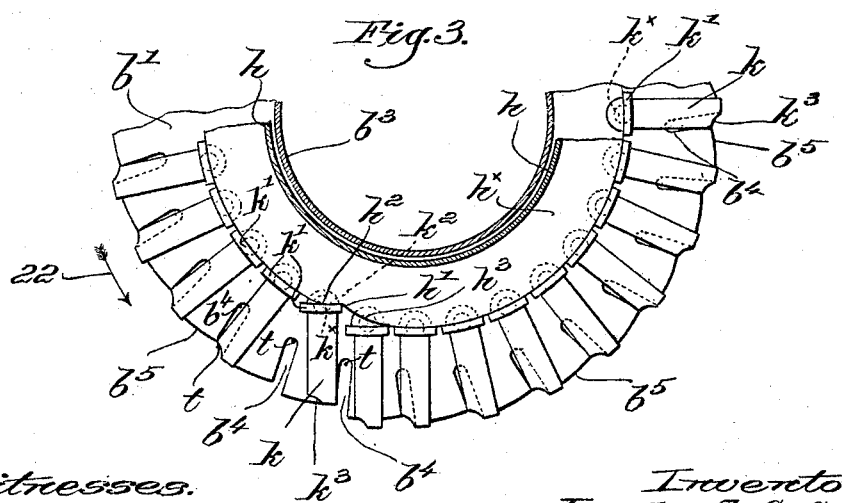

JOSEPH A. G. GOULET, OF MONTREAL, CANADA, ASSIGNOR TO DRAPER COMPANY, OF HOPEDALE, MASSACHUSETTS, A CORPORATION OF MAINE.

FILLING-REPLENISHING MECHANISM FOR LOOMS.

SPECIFICATION forming part of Letters Patent No. 695,045, dated March 11, 1902.

Application filed December 4, 1901. Serial No. 84,643. (No model.)

*To all whom it may concern:*

Be it known that I, JOSEPH A. G. GOULET, a subject of the King of Great Britain, and a resident of Montreal, Province of Quebec, Canada, have invented an Improvement in Filling-Replenishing Mechanism for Looms, of which the following description, in connection with the accompanying drawings, is a specification, like characters on the drawings representing like parts.

This invention relates to filling-replenishing mechanism for looms wherein a reserve filling supply is mounted in a suitable hopper or feeder to be transferred automatically therefrom to the shuttle as occasion demands—as, for instance, in the type of loom forming the subject-matter of United States Patent No. 529,940, dated November 27, 1894. The feeder therein shown comprises, essentially, two parallel circular plates mounted to rotate intermittently and in unison and adapted to hold between them a series of filling-carriers, which are transferred one by one from the feeder to the shuttle by suitable transferring means. The filling ends are led from the filling-carriers around a circular disk mounted to rotate with the feeder and located at the outer end thereof, and such filling ends are secured to a stud at the outer face of the disk in well-known manner. When a filling-carrier is inserted in the shuttle, it happens sometimes that the sudden strain or shock upon the filling end will break it before it can unwind with sufficient rapidity from the end of the filling-carrier.

The present invention has for its object the production of novel means for furnishing an additional or surplus length of filling between the filling-carrier and the point at which the filling end is held, so that when the filling-carrier is transferred to the shuttle and the latter leaves the box this extra or surplus portion of filling will be given up and an appreciable time afforded for the filling to unwind before a breaking strain is exerted thereupon.

The construction and arrangement to be hereinafter described are such that the filling between the filling-carrier and the point at which the filling end is secured will be maintained substantially taut until just before or at the time of transfer of the filling-carrier, when by suitable means the device which has held the filling end substantially taut will be automatically actuated to release the thread and permit it to become slack, to provide thereby the surplus desired.

The various novel features of my invention will be hereinafter described, and particularly pointed out in the following claims.

Figure 1 is a front elevation, partly broken out, of a filling-feeder with the filling end holder and with one embodiment of my invention applied thereto. Fig. 2 is a part end elevation of the mechanism shown in Fig. 1 looking toward the left, the lay and shuttle-box being shown in said Fig. 2. Fig. 3 is a sectional detail on the line 3 3, Fig. 1, looking toward the right to more clearly illustrate the operation of the thread-holding devices when they are in engagement with the thread and also when they have released the same; and Fig. 4 is a detail, partly in section, to be referred to, showing the change in position of the filling end when released to provide a slack portion.

The filling-feeder, comprising essentially the disks or plates $a$ $a'$, the hub or sleeve $a^3$ connecting them to rotate on the stud $a^6$, the fixed stud $f$, on which is mounted the transferrer $f'$ to act against the head of a filling-carrier $b$ and provided with a finger 21 to act against the tip thereof, the lay $A^3$, and the disk-like filling-end support $b'$ provided with a stud $b^2$, to which the ends of the filling are secured, may be and are all substantially as shown in the United States Patent referred to, and operate substantially as therein described, and certain changes in the detailed construction of the filling-end support will be hereinafter referred to.

The fixed stud $f$ is herein shown as having rigidly secured to its outer end the hub $g^\times$ of a bent upturned arm $g$, having at its upper end a large hub $g'$, which is concentric with the outer end of the stud $a^6$ and located adjacent the outer face of the plate $a'$, as clearly shown in Figs. 1 and 2, said hub $g'$ receiving the inner end of a substantially bell-shaped casting $h$, rigidly secured in said hub by a suitable set-screw 20, the outer end of the bell being flared in a plane and presenting an annular cam $h^\times$, which for the greater portion of its periphery is circular.

Referring to Fig. 3, the cam is shown as having a low portion $h'$, the circular periphery of the cam dropping quite suddenly to said low portion at the part $h^2$, and from the low point rising, as at $h^3$, again to the circular part. The cam is arranged in parallelism with and quite close to the filling-end support $b'$, the latter having its hub $b^3$ within the bell $h$ and rigidly secured to the feeder to rotate therewith, as in the patent referred to. In my present invention the said support $b'$ is provided with a series of non-radial slots $b^4$ (see Figs. 2 and 3) extended inward from its periphery toward the periphery of the fixed cam $h^\times$, and the periphery of the disk $b'$ may best be described as stepped or serrated between the slots, as at $b^5$, the direction of rotation of said disk being indicated by the arrows 22 in Figs. 2 and 3. A plurality of thread-supporting devices $k$, (shown as thin elongated plates,) each having at its inner end a segmental shoulder $k'$, are connected with the disk $b'$ by means of pivot-studs $k^\times$, which latter enter suitable holes arranged in a circle in the disk $b'$ concentric with its center of rotation, the centers of the pivots being on the line of the circular portion of the cam $h^\times$, as clearly shown in Fig. 3, the segmental shoulders $k'$ of the said devices being arcs of the same circle and adapted to travel on the periphery of the said cam when the filling-end support or disk $b'$ is rotated.

Referring to Fig. 4, it will be seen that the inner end of the thread-supporting device $k$ is extended beyond the shoulder, as at $k^2$, between the adjacent portions of the cam and the disk, so that when the parts are assembled the said devices $k$ are held in position on the disk, and they will be maintained in a radial position thereon when the shoulders $k'$ engage the circular part of the cam, and when the shoulder of any one of the said devices is brought opposite to the part $h^2$ of the cam by the bodily movement of such device with the disk, said device will be permitted thereby to swing on its pivot into a substantially vertical position, as shown in Fig. 3, and the radial position of such device will not be resumed until after it has been carried past the rising portion $h^3$ of the cam and again has its shoulder $k'$ in engagement with the circular part of said cam.

It will be manifest from the foregoing description that the devices $k$ have a substantially circular bodily path of movement due to rotation of the disk $b'$, as well as a relative swinging movement on their own pivot-studs $k^\times$ at a predetermined point in such bodily path of movement.

The outer end of each device $k$ is provided with a concave portion $k^3$, which is adapted to be engaged by and to receive a filling-thread, as $t$, when such device is in its normal radial position, and at such time it will be noted by reference to Fig. 3 that the mouth of the adjacent slot $b^4$ in the disk $b'$ is closed by the device.

When the weaver inserts a filling-carrier $b$ in the feeder to be held by and between the plates $a\ a'$, he takes the filling end $t$ and draws it over the periphery of the support $b'$, the thread resting in one of the seats or concave portions $k^3$ of the corresponding thread-engaging device $k$ and then winds the free end of the filling about the stud $b^2$, it being remembered that the device $k$ at such time closes the adjacent slot $b^4$ in the disk $b'$. Each of said slots is provided with its coöperating thread-engaging device $k$, and the feeder is arranged to support an equal number of supplies of filling. Each filling end is thus held by its individual engaging device $k$ between the outer end of the feeder and the disk or support $b'$ at the periphery of the latter, and the filling ends so engaged and held will be normally maintained sufficiently taut to prevent interference with each other as the feeder is intermittently rotated from time to time.

The filling-carrier to be transferred from the feeder to the shuttle S at the proper time is located substantially directly below the center of rotation of the feeder and is the endmost one of the series of filling-carriers mounted in the feeder, and the controlling-cam $h^\times$ is so positioned that its low point $h'$ and the part $h^2$, adjacent thereto, will operate to effect the movement of the thread-engaging devices $k$, one after another, when they approach the point at which the corresponding filling-carrier will be in position to be transferred, the position of the reëntrant portion of the cam being shown in dotted lines in Fig. 2.

While the filling-carriers are traveling around into operative position for transfer, the filling ends are maintained substantially taut and deflected from their direct path between the filling-end holder and the feeder by devices $k$ described, and thereby the fill-ends are prevented from becoming entangled one with another; but just before a filling-carrier reaches its position for transfer in the present embodiment of my invention the device $k$, engaging the filling end, will be moved into inoperative position, as has been described, to release the thread, and the latter will immediately slip into the adjacent slot $b^4$, which has been uncovered or opened by such movement of the thread-engaging device $k$, and in Fig. 3 it will be seen that two of the slots have been uncovered to permit the filling end $t$ to enter the same.

By referring to Fig. 4, where the normal position of the thread is shown in dotted lines at $t$, the slackening of the thread due to its release is indicated at $t^\times$. The slack or surplus portion of the filling end thus provided is ample to prevent a sudden strain or shock upon the filling end when the shuttle is thrown from the box.

In the present embodiment of my invention the action of gravity operates to swing the thread-engaging devices $k$ on their fulcra $k^\times$ as soon as the shoulder $k^2$ of one of such devices is brought opposite the reëntrant portion $h^2$ of the cam, the shape of the cam at such point assisting in such movement, and after the devices have passed the low point of the cam $h^\times$ they will assume and be maintained in a radial position by the coöperation of their shoulders with the circular portion of the cam. Each step $b^5$ of the disk sweeps inward from the periphery of the disk $b'$ toward the seat or concavity $k^3$ of the thread-engaging device which normally closes the slot $b^4$, toward the mouth of which the part $b^5$ of the disk-periphery is inclined, and inasmuch as the mouth of the slot is normally closed the thread will be maintained in the seat $k^3$ until such time as the thread-engaging device is moved to release the thread.

My invention is not restricted to the precise construction and arrangement herein shown and described, as the same may be varied or rearranged in different particulars without departing from the spirit and scope of my invention.

Having fully described my invention, what I claim as new, and desire to secure by Letters Patent, is—

1. In filling-replenishing mechanism for looms, a feeder to contain a supply of filling, a filling-end holder at the outer end thereof, a surplus portion of filling being provided between said holder and the feeder, a device to normally engage such surplus portion, and means to automatically disengage said device from and release the filling, to slacken the same.

2. In filling-replenishing mechanism for looms, a feeder to contain a plurality of supplies of filling, a holder for the several ends of filling, located at the outer end of the feeder, a series of devices to normally and individually engage and support surplus portions of filling between the holder and the feeder, and means to automatically and successively disengage said devices from the filling engaged thereby.

3. In filling-replenishing mechanism for looms, a rotatable feeder to contain a plurality of filling-carriers, means rotatable with the feeder to support and hold the several filling ends, a series of devices to individually engage and deflect the filling ends from their direct path between the feeder and said holding means, and means to positively and successively move said devices to release the filling ends engaged thereby.

4. In filling-replenishing mechanism for looms, a rotatable feeder to contain a plurality of filling-carriers, means rotatable with the feeder to support and hold the several filling ends, said means including a disk having a series of slots extended inward from its periphery, a series of movable thread-engaging devices mounted on said disk and adapted to normally close the slots and individually hold the filling ends at the periphery of the disk adjacent the slots, and means to automatically move said devices successively to release the filling end held thereby and open the adjacent slot, to permit the filling end to enter the same and become slack between the feeder and the disk.

5. In filling-replenishing mechanism for looms, a rotatable feeder to contain a plurality of filling-carriers, means rotatable with the feeder to support and hold the several filling ends, a series of devices pivotally mounted on said holding means and adapted to normally engage individual filling ends and maintain them substantially taut, and a fixed controlling-cam to coöperate with said devices and automatically effect the movement thereof singly, at a predetermined point to release the filling end engaged thereby.

6. In filling-replenishing mechanism for looms, a rotatable feeder to contain a plurality of filling-carriers, means rotatable with the feeder to support and hold the several filling ends, said means including a disk having a series of slots extended inward from its periphery, a series of movable thread-engaging devices mounted on said disk and adapted to normally close the slots and individually hold the filling ends at the periphery of the disk adjacent the slots, and a fixed controlling-cam to coöperate with said devices and normally maintain them in operative position, and to effect the releasing and slot-opening movement of said devices one after another at a predetermined point in the bodily path of movement of such devices.

7. In filling-replenishing mechanism for looms, a feeder to contain a supply of filling, a filling-end holder at the outer end thereof, a surplus portion of filling being provided between said holder and the feeder, a thread-engaging device pivotally mounted on the filling-end holder, to normally maintain the filling end deflected from its direct path and taut, and means to positively move said device at a predetermined time to release the filling end and thereby permit it to become slack between the feeder and the holder.

In testimony whereof I have signed my name to this specification in the presence of two subscribing witnesses.

JOSEPH A. G. GOULET.

Witnesses:
GEORGES N. FAUTEUX,
G. C. FAUTEUX.